United States Patent
Barczak et al.

(10) Patent No.: US 8,146,288 B2
(45) Date of Patent: Apr. 3, 2012

(54) STEERABLE FISHING LURE

(75) Inventors: James A. Barczak, Fremont, WI (US);
Michael P. Mayan, Rosendale, WI (US);
Mark J. Lambrecht, Mequon, WI (US)

(73) Assignee: Uncle Josh Bait Company, Fort Atkinson, WI (US)

( * ) Notice: Subject to any disclaimer, the term of this patent is extended or adjusted under 35 U.S.C. 154(b) by 931 days.

(21) Appl. No.: 12/173,678

(22) Filed: Jul. 15, 2008

(65) Prior Publication Data
US 2010/0011653 A1 Jan. 21, 2010

(51) Int. Cl.
*A01K 85/00* (2006.01)
(52) U.S. Cl. .................................. 43/42.22; 43/42.12
(58) Field of Classification Search .............. 43/42.22, 43/42.23, 42.03, 42.14, 42.15, 42.16, 42.18, 43/42.19, 42.2, 42.09, 44.92, 26.2, 27.2, 43/43.13, 42.46, 42.47, 42.02
See application file for complete search history.

(56) References Cited

U.S. PATENT DOCUMENTS

| | | | | |
|---|---|---|---|---|
| 1,182,010 A * | 5/1916 | Heddon | | 43/42.23 |
| 1,997,900 A * | 4/1935 | Edwards | | 43/42.15 |
| 2,580,733 A * | 1/1952 | Cowden | | 43/42.22 |
| 2,979,851 A * | 4/1961 | Telford | | 43/43.13 |
| 3,279,117 A * | 10/1966 | Weimer | | 43/42.03 |
| 4,054,004 A * | 10/1977 | Schott | | 43/42.09 |
| 4,215,507 A | 8/1980 | Russell | | |
| 4,777,761 A * | 10/1988 | Renaud | | 43/42.47 |
| 5,058,309 A | 10/1991 | Firmin | | |
| 5,185,951 A | 2/1993 | Hemmerle | | |
| 5,331,762 A | 7/1994 | Banks | | |
| 5,337,508 A * | 8/1994 | Pfeiffer | | 43/42.03 |
| 5,369,906 A | 12/1994 | Anterni | | |
| 5,519,960 A | 5/1996 | Cular | | |
| 5,595,013 A * | 1/1997 | Dubriske | | 43/19.2 |
| D396,261 S * | 7/1998 | Duncan | | D22/126 |
| 5,829,184 A * | 11/1998 | Studanski | | 43/43.13 |
| 6,122,854 A * | 9/2000 | Kinnear | | 43/42.02 |
| 6,931,784 B1 * | 8/2005 | Sutherland | | 43/42.22 |
| 2002/0095854 A1 | 7/2002 | Kinnear | | |
| 2007/0199234 A1 * | 8/2007 | Davis | | 43/42.47 |
| 2008/0104876 A1 * | 5/2008 | Ito | | 43/42.06 |
| 2008/0276522 A1 * | 11/2008 | Roh | | 43/43.13 |

\* cited by examiner

*Primary Examiner* — Joshua J Michener
(74) *Attorney, Agent, or Firm* — Lambrecht Patent Law, LLC

(57) ABSTRACT

A fishing lure that includes an adjustable head member statically coupleable in a first and second position, about an axis of rotation, to a body member. The body member has a vertical centerline plane. The adjustable head comprises a steering bill member projecting therefrom in a first direction. When the adjustable head member is in the first position, the first direction of the steering bill member is directed away from a first side of the centerline plane to steer the fishing lure, when moved through water, in a first steering direction. When the adjustable head member is in the second position, the first direction is directed away from a second side of the vertical centerline plane opposite the first side of the vertical centerline plane to steer the fishing lure, when moved through water, in a second steering direction.

20 Claims, 7 Drawing Sheets

STEERABLE FISHING LURE

BACKGROUND OF THE INVENTION

Embodiments of the present invention relate generally to fishing lures and, more particularly, to steerable fishing lures.

There are a wide variety of fishing lures designed for commercial, sport, and/or recreational purposes. Generally, the shape of a lure determines the manner in which the lure moves, often referred to as its "action," through the water while being retrieved or trolled. It is understood by those skilled in the art that the action of a lure helps to entices fish, when present, to strike or bite at the lure. Accordingly, in addition to lure action, it is also important to be able to place the lure in a region where fish are present.

Traditionally, lure placement has been controlled by a person's lure casting ability. A person with good casting ability has the ability to place a lure where desired. For example, fish often populate areas close to the shore, under piers, or by structure such as tree stumps. Accordingly, it is often beneficial to be able to cast a lure as close to the shore or structure as possible. Often, however, a shoreline, tree(s) hanging thereover, or the structure itself makes it difficult to place a lure in a desired location. In such circumstances, an improperly cast lure can lead to frustration since the result of such an improper cast can lead to a lure being caught in a tree, snagged by a pier, or snagged by the structure.

In order to at least partially alleviate lure entanglement, lures have come to market that have the ability to be steered. For example, one such lure, having an airplane-like shape, uses an immoveable rudder located on the rear tail of the lure to control the direction the lure travels as it is trolled or retrieved. As such, such a lure may be cast to within a close proximity of the shore and/or pier and, upon retrieval or trolling, the immoveable rudder causes the lure to move towards the shore and/or pier. However, since the rudders on such lures are immoveable, the lures are only one directional. That is, depending on the orientation of the rudder, the lure may only move towards the right hand side of the person fishing or only towards the left hand side of the person fishing. In other words, since such lures are not adjustable, separate lures are needed for each desired direction sought.

Another example of a steerable lure includes a spinner-type lure having a rudder dish attached thereto. By adjusting the orientation of the rudder dish, a person fishing can determine what direction the lure will travel upon retrieval or trolling. Though the rudder dish is adjustable, making such adjustments can be cumbersome and difficult.

In yet another example of a steerable lure, a lure having roughly a minnow-shape has two bill-like structures attached thereto. These bill-like structures are flush to the body of the lure unless the lure is jerked by the line attached thereto. The jerking motion causes one of the two bill-like structures to open and no longer remain flush with the lure. Due to the nature of this type of steerable lure, it is not always predictable which of the two bill-like structures will open upon implementing the jerking motion. Once opened, if the lure is retrieved or trolled, the resulting flow of water past the open bill-like structure causes the structure to remain open and steer the lure in the direction the open bill-like structure is facing. If, however, trolling or retrieving is paused, the opened bill-like structure will once again close flush to the surface of the lure. As such, the lure can no longer be steered until the line attached to the lure is once again jerked. Because of the unpredictable nature of which bill-like structure will open, the lure may be made to move in an unintended direction.

It would therefore be desirable to have an apparatus and method capable of adjustably and predictably controlling the direction of lure travel as the lure travels through water.

BRIEF DESCRIPTION OF THE INVENTION

Embodiments of the present invention provide an apparatus that overcomes the aforementioned drawbacks. A rotatable member is a coupleable to a body in a plurality of positions. The rotatable member has a steering member extending therefrom configured to steer the body as the body moves through water.

In accordance with an embodiment of the invention, a fishing lure includes an adjustable head member statically coupleable in a first and second position, about an axis of rotation, to a body member. The body member has a vertical centerline plane. The adjustable head comprises a steering bill member projecting therefrom in a first direction. When the adjustable head member is in the first position, the first direction of the steering bill member is directed away from a first side of the centerline plane to steer the fishing lure, when moved through water, in a first steering direction. When the adjustable head member is in the second position, the first direction is directed away from a second side of the vertical centerline plane opposite the first side of the vertical centerline plane to steer the fishing lure, when moved through water, in a second steering direction. In accordance with another embodiment of the invention, an artificial bait includes a lure portion, an affixing member, and a steering shovel member. The lure portion has a vertical centerline plane, which has a first side facing a first direction and a second side facing a second direction. The affixing member, which is rotatable about an axis of rotation, is securably affixable to the lure portion in a first and second position about the axis of rotation. The steering shovel member extends in a projection direction and is securably affixable in the first position such that the projection direction points at least partially in the first direction to steer the artificial bait in a first steering direction. In addition, the steering shovel is securably affixable in the second position such that the projection direction points at least partially in the second direction to steer the artificial bait in a second steering direction.

In accordance with yet another embodiment of the invention, a method of manufacturing a steerable fishing lure includes forming a lure body having a vertical centerline plane, forming a multi-directional steering component having a lip projecting therefrom in a projection direction, and forming a mounting system capable of securing the multi-directional steering component to the lure body in a first and a second position to steer the fishing lure in a first and second steering direction, respectively. The vertical centerline plane has a first side facing a first direction and a second side facing a second direction. The multi-directional steering component is rotatable about the axis of rotation and statically securable to the lure body in the first position such that the projection direction is at least partially directed toward the first direction. In addition, the multi-directional steering component is rotatable about the axis of rotation and statically securable to the lure body in a second position such that the projection direction is at least partially directed toward the second direction. The mounting system includes a first affixing component attached to the multi-directional steering component and a second affixing component attached to the lure body.

Various other features and advantages of the present invention will be made apparent from the following detailed description and the drawings.

BRIEF DESCRIPTION OF THE DRAWINGS

The drawings illustrate several embodiments of the invention.

In the drawings.

DETAILED DESCRIPTION OF THE PREFERRED EMBODIMENT

Figure 1:
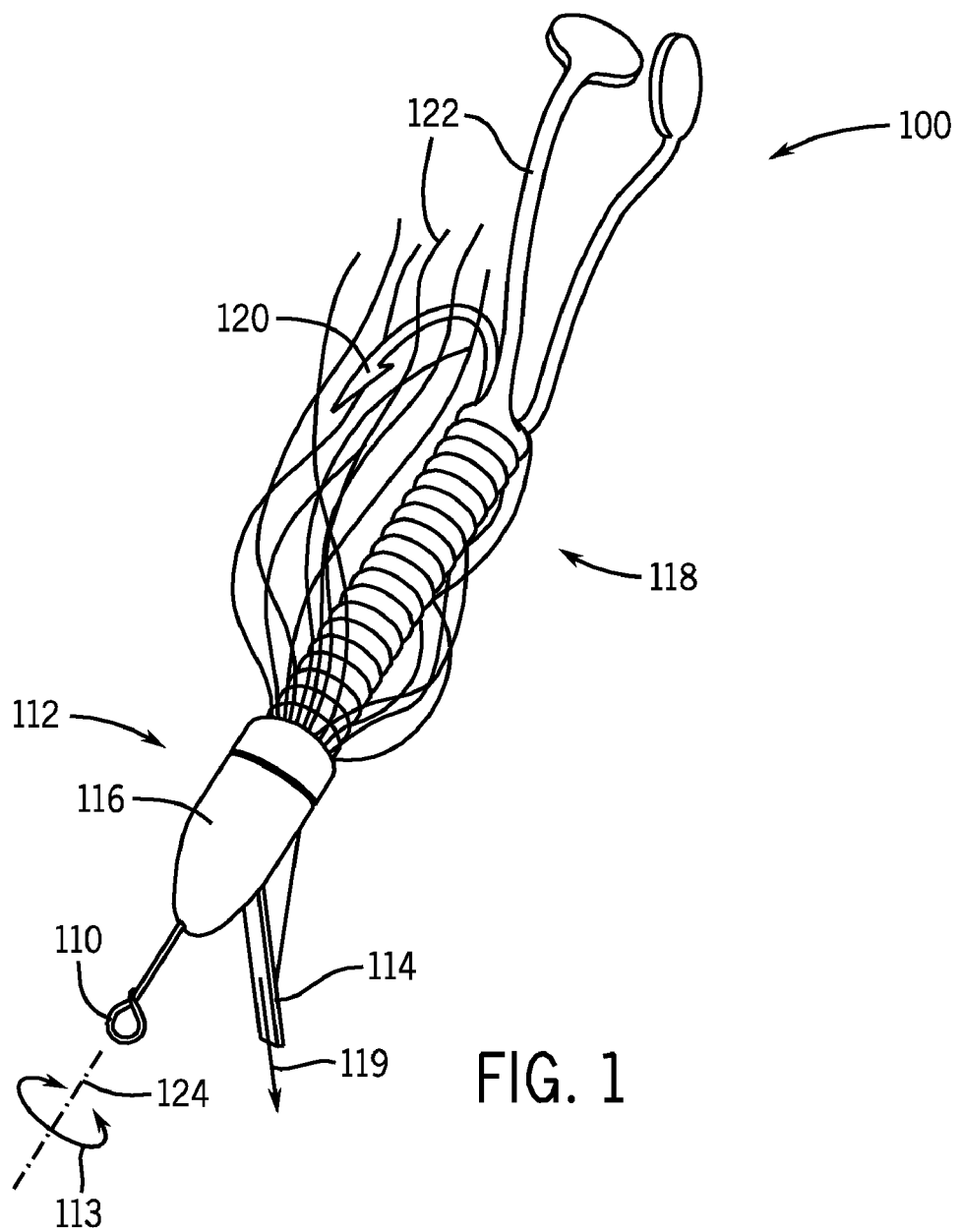
FIG. 1 is a perspective view of a steerable fishing lure according to an embodiment of the invention.

Referring to FIG. 1, a perspective view of a steerable fishing lure according to an embodiment of the invention is shown. The steerable lure 100 has an eyelet 110 and a steering portion 112 rotationally coupled to the eyelet. Eyelet 110 may serve as a "stopper" for steering portion 112 such that steering portion 112 is not inadvertently removed and dropped in the water. In the present embodiment, the steering portion 112 comprises a steering shovel, bill, or lip, 114 projecting from an adjustable head 116. The adjustable head 116, with the steering bill 114 member projecting therefrom, is statically affixable to a fishing lure body 118, which is attached to eyelet 110. The steering bill member 114 is configured to steer the fishing lure 100 and extends from the adjustable head in first direction 119. The lure body 118 includes a hook 120 coupled thereto. In addition, the body also includes a dressing 122 coupled thereto. As shown in the present embodiment, the jig-shaped lure has one hook 120 projecting from the body 118. It is contemplated, however, that more than one hook could be coupled to the body 118. Further, it also contemplated that a wide variety of dressings could be used in place of, or in addition to, the dressing 122 depicted.

Figure 2:
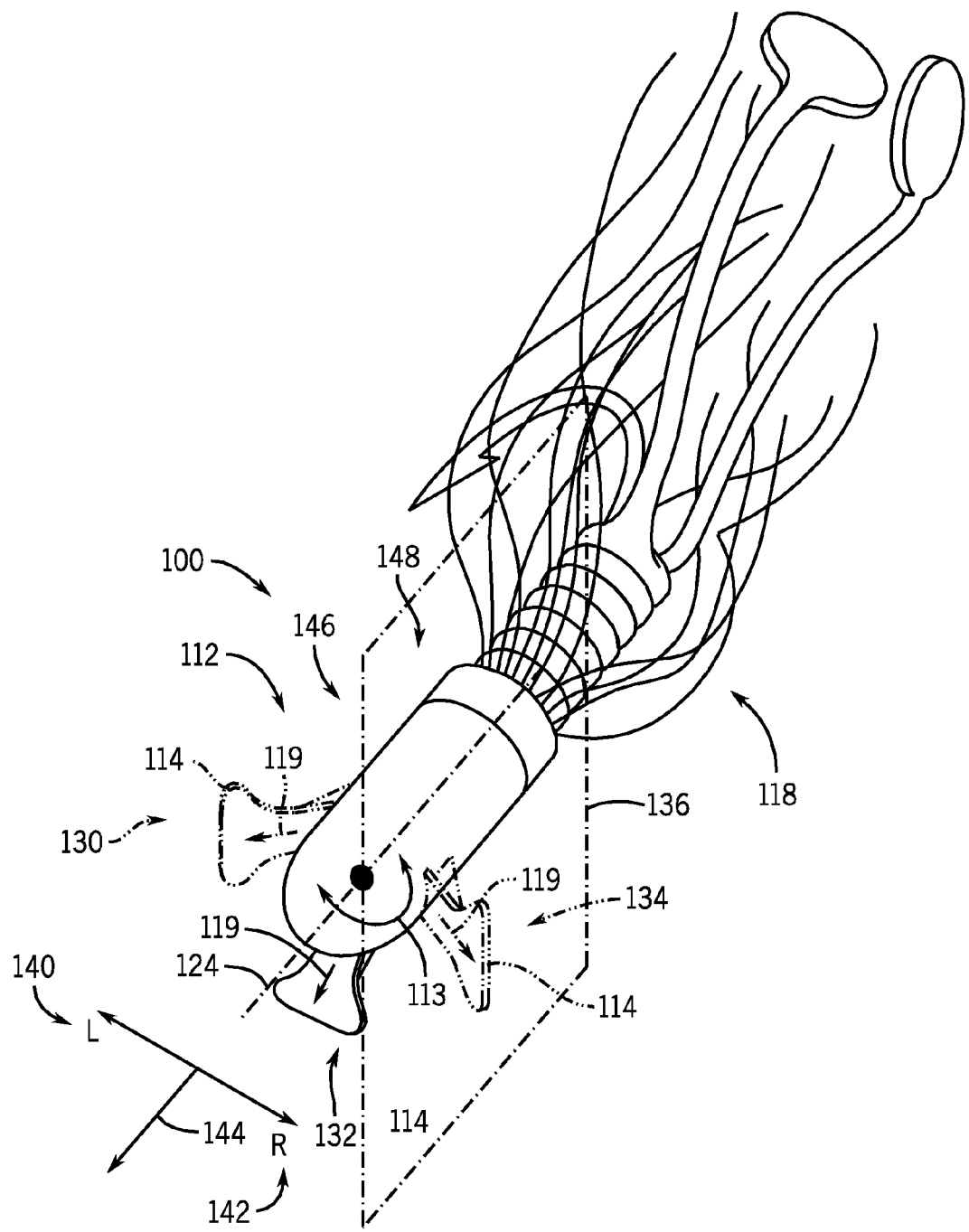
FIG. 2 is perspective view of a steerable fishing lure with vertical centerline plane according to an embodiment of the invention.

The steering portion or affixing member 112 of the lure is able to rotate 113, at least to some degree, about an axis of rotation 124 such that it may be statically coupled (i.e., affixed or secured) in one of at least two different positions. To illustrate the differing steering positions, FIG. 2 depicts a perspective view of the steering portion 112 of a lure 100 that may be secured or affixed in different positions 130, 132, 134. The positions 130-134 are referenced to an axis of rotation 124 and a centerline plane 136. The centerline plane 136 is an imaginary plane that vertically bisects the lure 100 body 118 as it is in its vertical or operating orientation. Though it is contemplated that only two different positions (e.g., position 130 and 134) are needed so that a lure such as lure 100 may be steered in different directions, FIG. 2 depicts a steering portion 112 that is securably coupleable in three positions 130-134 about an axis of rotation 124 such that a lure may be steered in three directions 140-144. Examples of the manner in which an affixing member or steering portion, such as steering portion 112, may be secured or statically coupled in one of the at least two positions will be described in greater detail with respect to FIGS. 4, 6-7.

Still referring to FIG. 2, the steering portion 112 of the lure may be rotated 113 about the axis of rotation 124 and affixed in three different positions 130-134. The relative direction of lure travel 140-144 is determined by the position 130-134 of bill 114. The relative direction of lure travel may also be associated with the centerline plane 136. For example, the centerline plane has two sides 146, 148, and each side faces one of the relative directions of lure travel 140, 142. For example, a first side 146 of centerline plane 136 faces the leftward direction 140, whereas the second side 148 of centerline plane 136 faces the rightward direction 142.

As such, if the steering portion 112 is statically coupled in position 132 such that the projection direction 119 of the bill 114 is not directed away from either side 146, 148 of the centerline plane 136 of the body 118, the lure 100 will tend to travel in a substantially straight direction 144. On the other hand, if the steering bill member 114 is rotated about the axis of rotation 124 and affixed in position 130, with the first direction (i.e., projection direction) 119 pointing away from a first side 146 of centerline plane 136, the lure 100 will tend to travel in a leftwardly direction 140 during retrieval or trolling. In other words, if the bill member 114 at least partially projects in the leftward direction 140, which is the same direction that side 146 faces, the lure will tend to travel in the leftward direction 140.

Lure travel may be further manipulated by rotatably positioning the steering component 112 in position 134 such that the projection direction 119 of bill 114 is directed away from the second side 148, opposite the first side 146, of centerline plane 136. That is, lure travel may be further manipulated if bill member 114 is positioned such that the projection direction 119 at least partially points in the rightward direction 142, which is the same direction that side 148 of centerline plane 136 faces.

Though only three positions 130-134 are depicted in FIG. 2, it is contemplated that many other positions (not shown) about the axis of rotation 124 could be selectable such that the direction of lure travel may be manipulated to a greater or finer degree. Further, though lure travel is shown to be in a leftward, rightward, or substantially straight direction 140, 142, 144, respectively, it will be understood by those skilled in the art that the bill 114 may also tend to direct the lure in a downward direction if the projection direction 119 is directed, at least partially, in the downward direction. However, the degree to which a lure actually moves in a downward direction will be affected by at least lure buoyancy relative to the water, lure center of gravity, bill shape and size, and lure aerodynamics.

Figure 3:
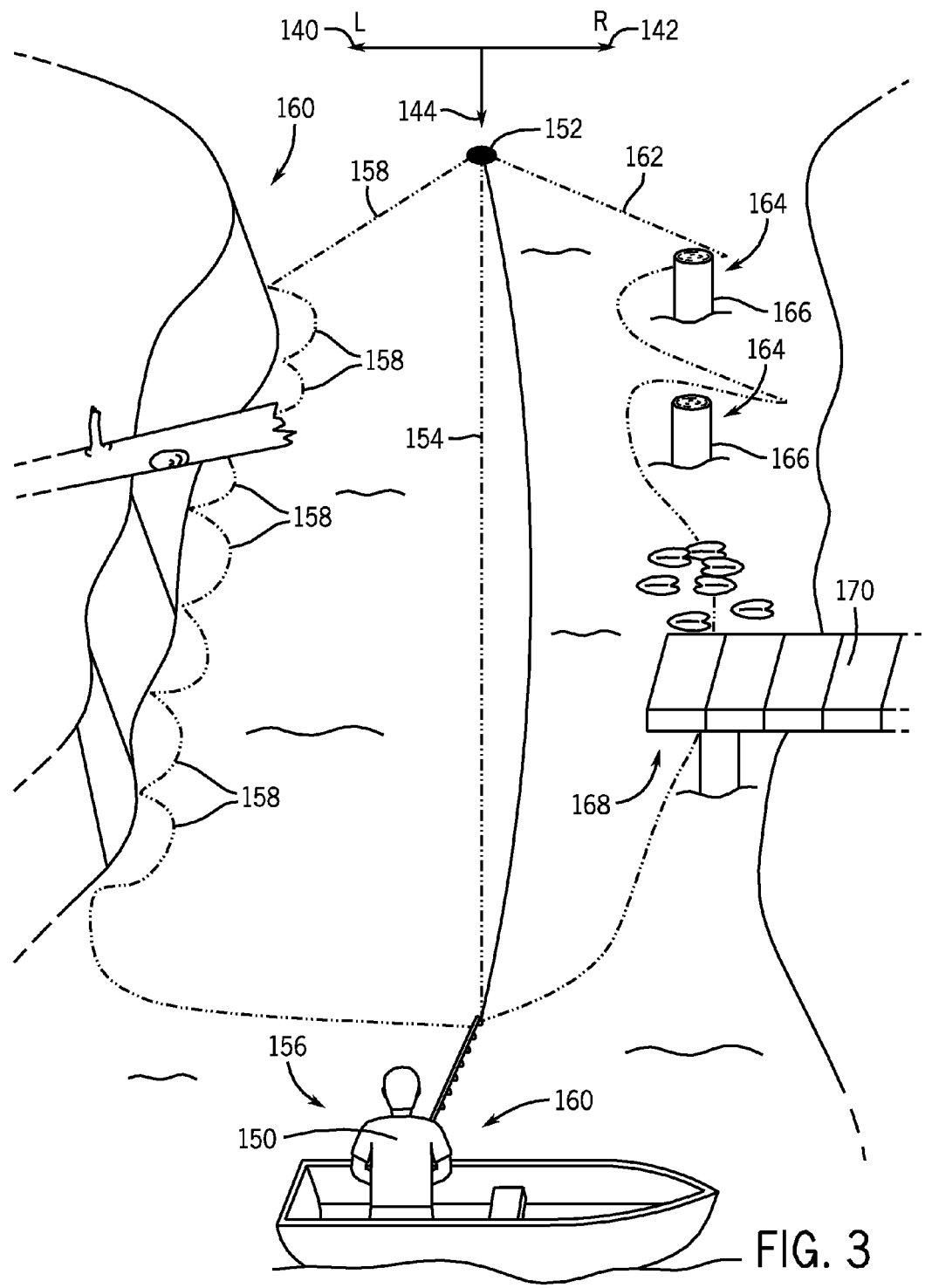
FIG. 3 is an illustration of exemplary steerable paths of a steerable lure according to an embodiment of the invention.

FIG. 3 is an illustration of exemplary steerable paths of a steerable lure according to an embodiment of the invention. Referring to both FIGS. 2 and 3, if a fisherman 150 orients and securably affixes the steering portion 112 of lure 100 in the straight position 132, a cast of lure 100 to point 152 would result in lure travel in a substantially straight direction 144 during retrieval or trolling. As such, the lure could, for example, follow path 154. If fisherman 150 were to orient the steering portion 112 in position 130, a cast of lure 100 to point 152 would result in lure travel towards the fisherman's left side 156 in the leftwardly direction 140. That is, as the lure is reeled in or trolled, water flowing past the steerable bill 114 that is affixed in position 130 will cause the lure to travel in a leftwardly direction 140. There are many benefits that arise from being able to steer a fishing lure. For example, as depicted in FIG. 3, a lure travelling in the leftwardly direction 140 may be a caused to travel or bump, as depicted by path 158, along a cliff-like structure 160 or the like. Such control is difficult in non-steerable, traditional lures.

If fisherman 150 orients the steering portion 112 in position 134, lure 100 tends to travel in a rightwardly direction 142 during retrieval or trolling. That is, lure 100, with its adjustable steering portion 112 positioned in position 134, tends to travel towards a fisherman's right side 160 during retrieval or trolling. For example, with steering bill 114 secured in position 134, lure 100 may be caused to travel along path 162 depicted in FIG. 3 after lure placement at location 152 during casting. As discussed, the ability to control the direction of lure travel has a wide variety of benefits. As illustrated with path 162, a rightward direction 142 of travel tends to cause lure 100 to "swim" past the backside 164 of structures such as tree stumps 166. Further, such directional capabilities allow fisherperson 150 to cause lure 100 to travel underneath 168 a pier 170 or other structure over hanging the water.

Figure 4:
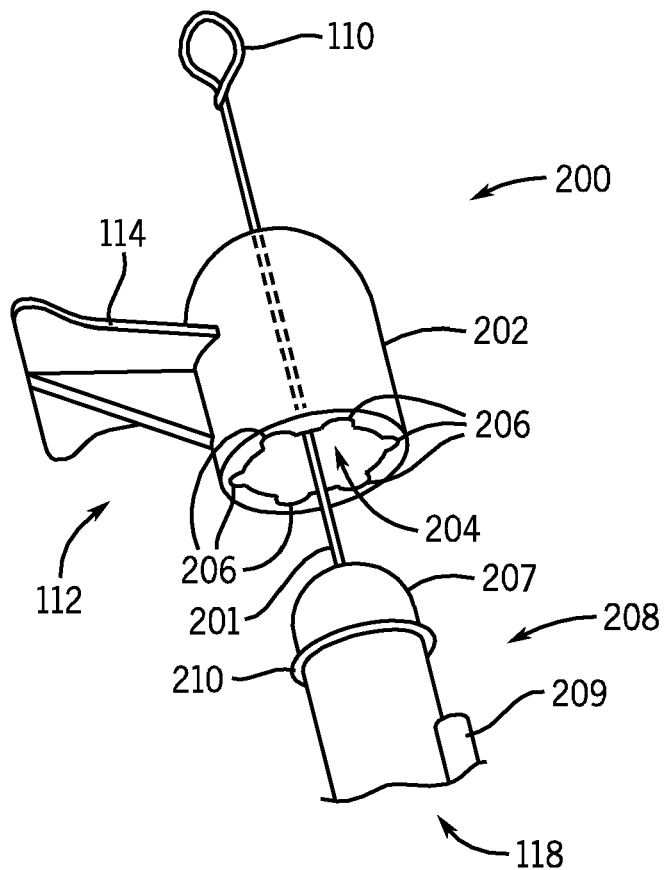
FIG. 4 is a perspective view of a coupling system for the steerable fishing lure of FIGS. 1-2 according to an embodiment of the invention.

FIG. 4 is a perspective view of a fastening or coupling system 200 for securably coupling a steering portion 112 to eyelet 110 according to an embodiment of the invention. Eyelet 110 is fixedly coupled to fishing lure body 118 via an eyelet connector 201. Steering portion 112 includes a female cavity 204 through which eyelet connector 201 extends. Cavity 204 has a plurality of slots 206 formed therein. Eyelet connector 201 is fixedly attached to a male end 208 of fishing lure body 118. Male end 208 includes a post 207 and an appendage or protrusion 209 configured to mate with slots 206 to secure or affix steering portion 112 in the desired position. In other words, after steering portion 112 is oriented such that steering bill 114 points in the desired direction, male end 208 is inserted into of female cavity 204 such that appendage 209 enters into one of the plurality of slots 206. As such, steering portion 112 and male end 208 are affixed or mated into the desired position relative to one another. In one embodiment, slots 206 and appendage 209 are a couple in a snap-fit arrangement. That is, appendage 209 may snap into a slot 206 to provide coupling force to maintain engagement of steering portion 112 over male end 208. A washer 210 may also be positioned about male end 208 to help ensure a snug fit between male end 208 and steering portion 112. In one embodiment, washer 210 is made of silicon or rubber. Accordingly, the coupling system 200 allows for the bill 114 to be affixed or secured into the desired position. As depicted, female cavity or bore 204 includes six slots 206. As such, the bill 114 may be oriented in six different positions. It is contemplated, however, that more or less than six slots 206 may be formed or manufactured into female cavity 204.

Figure 5:
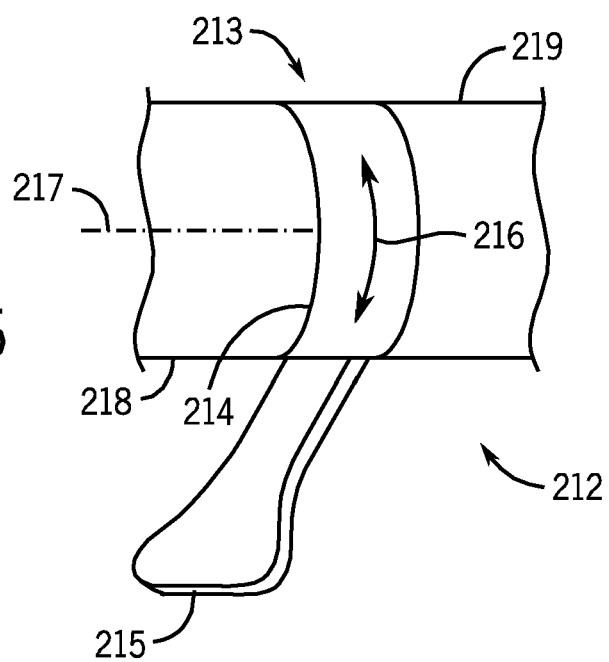
FIG. 5 is a perspective view of a steerable fishing lure having a collar-type steering portion according to an embodiment of the invention.

Referring now to FIG. 5, a steerable fishing lure 212 having a collar-type steering portion is shown. As depicted, a steering portion 213 includes a collar 214 and a steering lip or bill 215 projecting therefrom in projection direction 119. The collar 214 can be rotated 216 about an axis of rotation 217 such that it may be affixed into at least two different positions (e.g., position 130-134 of FIG. 2) to control the direction of lure travel. The collar 214 is coupled to lure 212 between lure portions 218, 219. Lure portion 219 may be, for example, a lure body such as lure body 118 of fishing lure 100 of FIG. 1. Lure portion 218 may be, for example, designed to resemble a head of a bait for catching a desired fish. Rotation of collar 214 about the axis of rotation 217 allows a fisherman to securably affix or couple bill member 215 in the desired steering position (e.g., positions 130-134 of FIG. 2).

Figure 6:
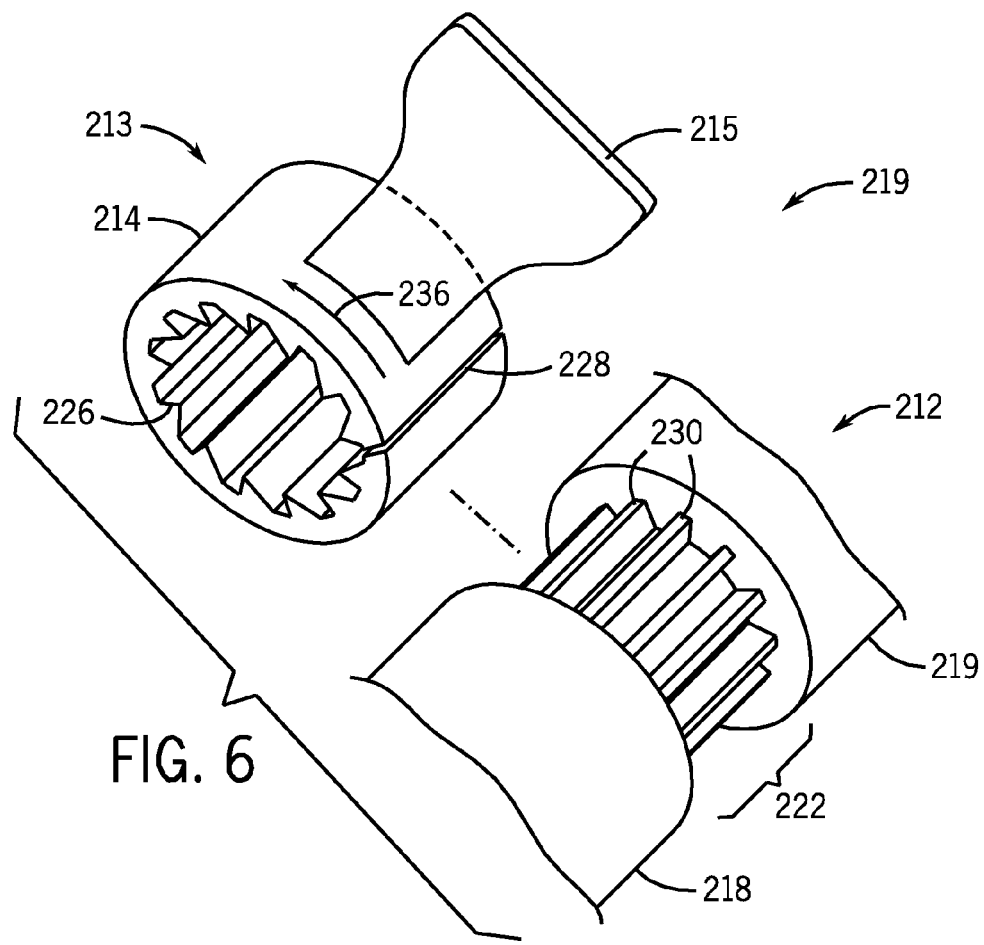
FIG. 6 is a perspective exploded view of a coupling system for the steerable fishing lure of FIG. 5 according to an embodiment of the invention.

FIG. 6 shows a coupling system 219 for the steerable fishing lure 212 of FIG. 5 according to an embodiment of the invention. Steering portion 213 is shown exploded from steerable fishing lure 212 for clarity. As shown, a fastening system 219 includes a series or plurality of teeth 226 and a seam 228 formed or integrated with collar 214 and a plurality of ridges 230 formed in a collar receiving portion 222 between lure portions 218, 219 of lure 212. A user may open collar 214 at seam 228 and insert collar 214 over collar receiving portion 222. Once inserted, the series of teeth 226 will engage with the series or plurality of ridges 230, causing bill 215 to be secured or affixed in a desired position.

Figure 7:
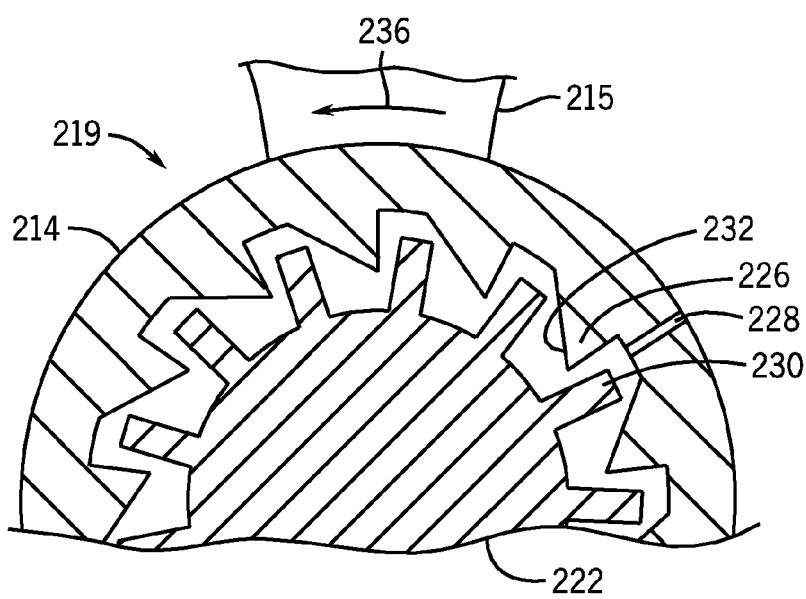
FIG. 7 is a cross-sectional assembled cut-away view of the coupling system of FIG. 6 according to an embodiment of the invention.

FIG. 7 depicts a cross-sectional assembled view of fastening or coupling system 219 of FIG. 6 according to an embodiment of the invention. Since the teeth 226 are sloped on one side 232, collar 214 may be rotated by a user in the counter-clockwise direction 236 with respect to collar receiving portion 222. Of course, if the teeth 226 were sloped on the side opposite than that shown, the collar 214 could be rotated in the clockwise direction. By rotating collar 214, a user can orient the bill 215 to a desired position. As will be appreciated by those skilled in the art, the collar 215 with bill 215 projecting therefrom may be oriented in as many positions as there are teeth 226. For example, in the embodiment depicted in FIG. 6, bill 215 could be oriented in thirteen different positions. Other embodiments are, however, contemplated that have more or less than thirteen teeth 226 and corresponding ridges 230. The design of teeth 226 and ridges 230 is determined such that during use, the force of water (not shown) on bill 215 will not cause the collar 214 to rotate. As such, once bill 215 is placed in the desired position or location, lure use in water will not inadvertently cause the bill 215 to move to another position.

It is contemplated that collar receiving portion 222 could be manufactured to have the series of teeth 226, rather than collar 214. In such an embodiment, the collar 214 would then be manufactured to have the series of ridges 230, rather than the teeth 226. In addition, it is also contemplated that collar 214 need not have seam 228 incorporated therein. That is, the lure could be manufactured such that collar 214 is placed around collar receiving portion 222 during assembly, obviating the need for seam 228. In yet another embodiment, coupling system 219 could be incorporated into an adjustable head and post coupling system.

Figure 8:
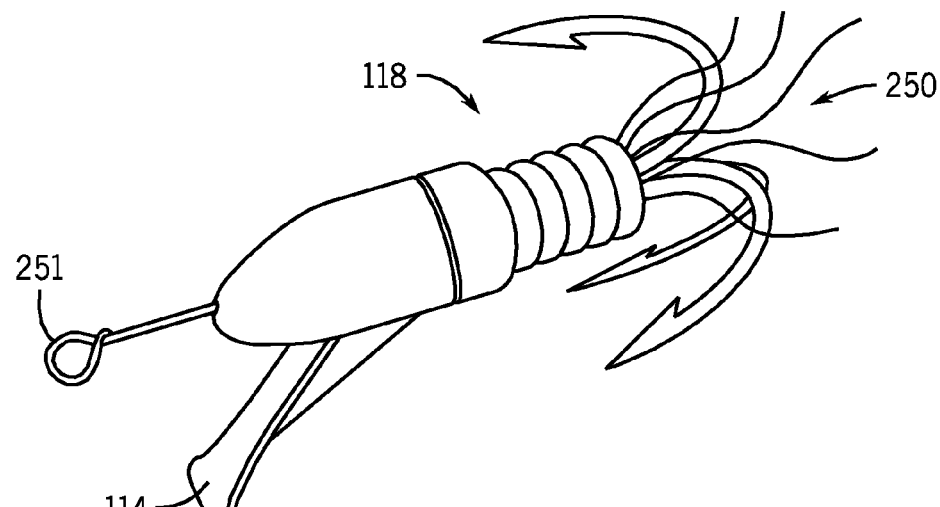
FIG. 8 is a perspective view of a substantially bucktail-shaped lure according to an embodiment of the invention.
Figure 9:
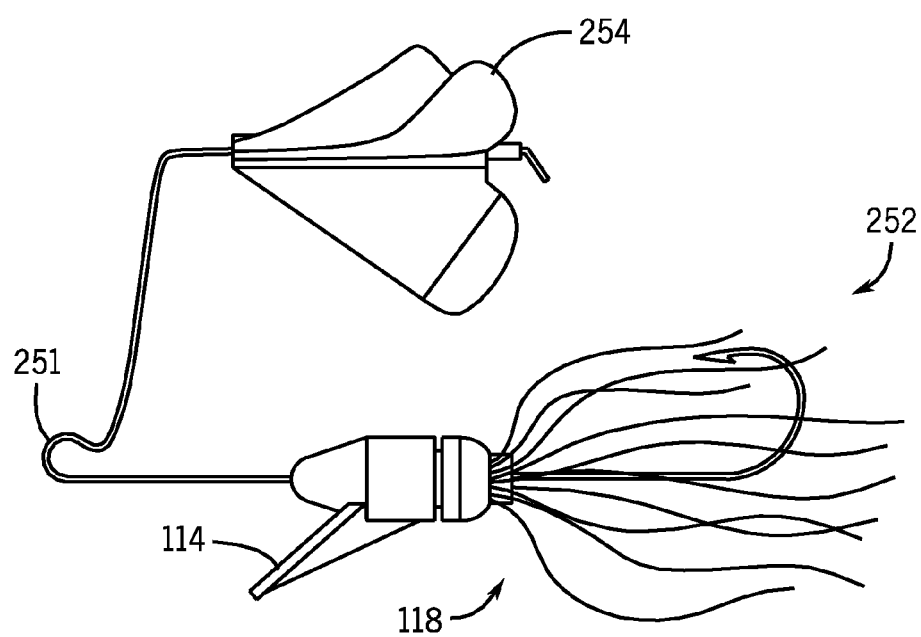
FIG. 9 is a perspective view of a substantially buzz-bait-shaped lure according to an embodiment of the invention.

Referring now to FIG. 8-11, a variety of lure shapes incorporating a rotatable steering bill according to embodiments of the invention are shown. An embodiment shown in FIG. 8 depicts a bucktail-shaped lure 250 having an eyelet 251 with a rotatable bill 114 rotatably coupled to a body member 118. Another embodiment, shown in FIG. 9, depicts a buzzbait-shaped lure 252 having an attached propeller 254 and a rotatable bill 114 rotatably coupled to an eyelet 251 As with other embodiments, the shovel or bill member 114 is rotatably coupled to a body member 118. It is contemplated that a spoon (not shown) could be attached to the buzzbait-shaped lure 252 rather than or in conjunction with propeller 254.

Figure 10:
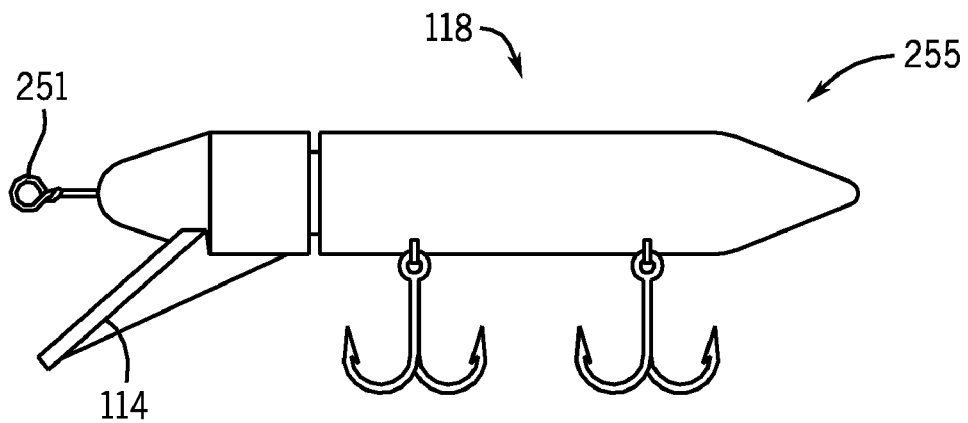
FIG. 10 is a perspective view of a substantially cylindrical-shaped lure according to an embodiment of the invention.
Figure 11:
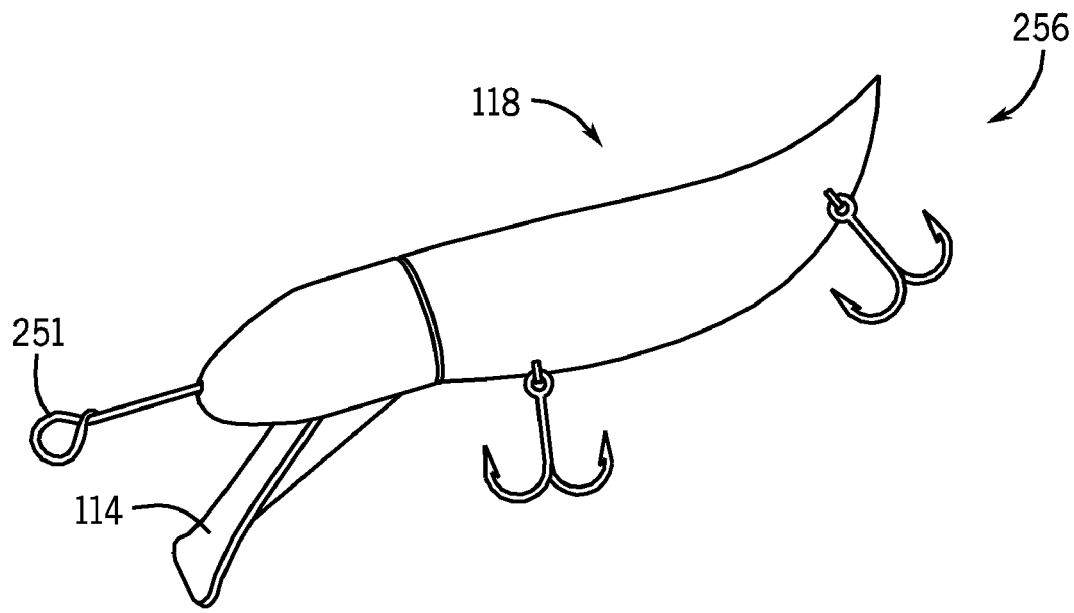
FIG. 11 is a perspective view of a substantially blade-shaped lure according to an embodiment of the invention.

Yet another embodiment shown in FIG. 10 depicts a substantially cylindrical or minnow-shaped lure 255 having an eyelet 251 and a rotatable bill 114 rotatably coupled to body member 118. Still another embodiment shown in FIG. 11 depicts a blade-shaped lure 256 with the rotatable bill 114 rotatably coupled to body member 118.

It is contemplated that the bill or lip members 114, 215 described herein may incorporate a wide variety of shapes and/or orientations. That is, bill member 114, 215 could be formed or manufactured in shapes other than those shown. Further, the bill member 114, 215 could be formed or manufactured to project from the affixing or steering members in greater or lesser degrees than those depicted herein.

In accordance with one aspect, a fishing lure includes an adjustable head member statically coupleable in a first and second position, about an axis of rotation, to a body member. The body member has a vertical centerline plane. The adjustable head comprises a steering bill member projecting therefrom in a first direction. When the adjustable head member is in the first position, the first direction of the steering bill member is directed away from a first side of the centerline plane to steer the fishing lure, when moved through water, in a first steering direction. When the adjustable head member is in the second position, the first direction is directed away from a second side of the vertical centerline plane opposite the first side of the vertical centerline plane to steer the fishing lure, when moved through water, in a second steering direction.

In accordance with another aspect, an artificial bait includes a lure portion, an affixing member, and a steering shovel member. The lure portion has a vertical centerline plane, which has a first side facing a first direction and a second side facing a second direction. The affixing member, which is rotatable about an axis of rotation, is securably affixable to the lure portion in a first and second position about the axis of rotation. The steering shovel member extends in a projection direction and is securably affixable in the first position such that the projection direction points at least partially in the first direction to steer the artificial bait in a first steering direction. In addition, the steering shovel is securably affixable in the second position such that the projection direction points at least partially in the second direction to steer the artificial bait in a second steering direction.

In accordance with yet another aspect of the invention, a method of manufacturing a steerable fishing lure includes forming a lure body having a vertical centerline plane, forming a multi-directional steering component having a lip projecting therefrom in a projection direction, and forming a mounting system capable of securing the multi-directional steering component to the lure body in a first and second position to steer the fishing lure in a first and second steering direction, respectively. The vertical centerline plane has a first side facing a first direction and a second side facing a second direction. The multi-directional steering component is rotatable about the axis of rotation and statically securable to the lure body in the first position such that the projection direction is at least partially directed toward the first direction. In addition, the multi-directional steering component is rotatable about the axis of rotation and statically securable to the lure body in a second position such that the projection direction is at least partially directed toward the second direction. The mounting system includes a first affixing component attached to the multi-directional steering component and a second affixing component attached to the lure body.

The present invention has been described in terms of embodiments, and it is recognized that equivalents, alternatives, and modifications, in addition to those expressly stated, are possible and within the scope of the appending claims.

What is claimed is:

1. A fishing lure comprising:
a body member having a vertical centerline plane;
an adjustable head comprising a steering bill member projecting in a first direction therefrom, the adjustable head statically coupleable to the body member in a first and second position about an axis of rotation to steer the fishing lure in a respective first and second steering direction when the fishing lure is moved through water; and
wherein the first direction is directed away from a first side of the centerline plane when the adjustable head is statically coupled to the body member in the first position, and wherein the first direction is directed away from a second side of the vertical centerline plane opposite the first side of the vertical centerline plane when the adjustable head is statically coupled to the body member in the second position.

2. The fishing lure of claim 1 further comprising a coupling system for statically coupling the adjustable head to the body member in the first and second positions.

3. The fishing lure of claim 2 wherein the coupling system comprises a fastening protrusion.

4. The fishing lure of claim 3 wherein the coupling system further comprises a plurality of slots, wherein each slot is configured to receive the fastening protrusion therein, and wherein the fastening protrusion is statically coupleable in any one of the plurality of slots to secure the adjustable head in one of the first and second positions.

5. The fishing lure of claim 1 further comprising at least one hook coupled to the body member.

6. The fishing lure of claim 1 wherein a shape of the fishing lure is one of a cylindrical shape, a jig shape, a bucktail shape, a buzzbait shape, and a blade shape.

7. The fishing lure of claim 1 wherein the body member comprises a propeller.

8. An artificial bait comprising:
a lure portion having a vertical centerline plane, wherein the vertical centerline plane has a first side facing a first direction and a second side facing a second direction;
an affixing member rotatable about an axis of rotation and securably affixable to the lure portion in a first and second position about the axis of rotation; and
a steering shovel member fixedly attached to the affixing member and extending in a projection direction, wherein the steering shovel member is securably affixable in the first position such that the projection direction points at least partially in the first direction to steer the artificial bait in a first steering direction, and wherein the steering shovel is securably affixable in the second position such that the projection direction points at least partially in the second direction to steer the artificial bait in a second steering direction.

9. The artificial lure of claim 8 further comprising at least one mounting appendage and at least two mounting slots, wherein the at least one mounting appendage is securable into either one of the at least two mounting slots to securably affix the steering shovel member into one of the first and second positions.

10. The artificial bait of claim 9 wherein the at least two mounting slots comprises three mounting slots, and wherein the at least one mounting appendage is affixably securable into any of the three mounting slots such that the steering shovel member is securably affixable in one of the first position, the second positions, and a third position.

11. The artificial lure of claim 8 wherein the affixing member is a collar.

12. The artificial bait of claim 11 further comprising:
a series of teeth formed in the collar;
a series of ridges formed in the lure portion, and
wherein the series of teeth are capable of engagement with the series of ridges to securably affix the collar in one of the first and second positions.

13. The artificial bait of claim 11 wherein the lure portion comprises a lure head, and wherein the collar is rotatably attached to the lure head.

14. The artificial bait of claim 8 wherein the affixing member is a lure head.

15. A method of manufacturing a steerable fishing lure comprising:
- forming a lure body having a vertical centerline plane, the vertical centerline plane comprising a first side facing a first direction and a second side facing a second direction;
- forming a multi-directional steering head comprising a lip projecting therefrom in a projection direction, wherein the multi-directional steering head is rotatable about an axis of rotation and statically securable to the lure body in a first position such that the projection direction is at least partially directed toward the first direction, and wherein the multi-directional steering head is rotatable about the axis of rotation and statically securable to the lure body in a second position such that the projection direction is at least partially directed toward the second direction; and
- forming a mounting system capable of securing the multi-directional steering head to the lure body in the first and second positions to steer the fishing lure in a first and second steering direction, respectively, wherein the mounting system comprises a first affixing component attached to the multi-directional steering head and a second affixing component attached to the lure body.

16. The method of claim 15 wherein forming the mounting system comprises:
- forming a plurality of grooves in a bore of the multi-directional steering head; and
- forming an appendage on the lure body, the appendage capable of mating with each of the plurality of grooves.

17. The method of claim 15 wherein forming the mounting system comprises:
- forming a plurality of teeth in a bore of the multi-directional steering head; and
- forming a plurality of ridges on the lure body, the plurality of ridges capable of mating with the plurality of teeth.

18. The method of claim 15 further comprising statically securing the first affixing component to the second affixing component.

19. The method of claim 15 further comprising attaching at least one hook to the steerable fishing lure.

20. The method of claim 15 further comprising attaching a propeller to the steerable fishing lure.

* * * * *